US005314271A

United States Patent [19]

Christiano

[11] Patent Number: 5,314,271

[45] Date of Patent: May 24, 1994

[54] PORTABLE DRILL GUIDE

[76] Inventor: Nicholas W. Christiano, 58 Bodwell St., Hartford, Conn. 06114

[21] Appl. No.: 985,019

[22] Filed: Dec. 3, 1992

[51] Int. Cl.[5] .................... B23B 45/14

[52] U.S. Cl. .................... 408/87; 408/99; 408/111; 408/712

[58] Field of Search .................... 408/87, 92, 99, 103, 408/108, 110, 111, 712, 72 R, 72 B, 97, 100

[56] References Cited

U.S. PATENT DOCUMENTS

| | | | |
|---|---|---|---|
| 55,695 | 6/1866 | Nevergold et al. | 408/87 |
| 1,701,673 | 2/1929 | Hewel | 408/99 |
| 3,386,318 | 6/1968 | Pekarcik et al. | 408/97 |
| 4,027,992 | 6/1977 | Mackey, Sr. et al. | 408/97 |
| 4,540,319 | 9/1985 | Michiharu | 408/100 |
| 5,163,792 | 11/1992 | Slavik | 408/104 X |

FOREIGN PATENT DOCUMENTS

| | | | |
|---|---|---|---|
| 2240066 | 2/1974 | Fed. Rep. of Germany | 408/99 |
| 2915429 | 10/1980 | Fed. Rep. of Germany | 408/108 |
| 529217 | 11/1940 | United Kingdom | 408/99 |

*Primary Examiner*—Steven C. Bishop
*Attorney, Agent, or Firm*—Chilton, Alix & Van Kirk

[57] ABSTRACT

A guide mechanism and a portable drill are coupled together to define a portable, hand-operated drilling device. The drilling device includes a replaceable back-up fixture for engaging a first side of a workpiece and a drill support which adjustably and releasably engages a drill. The back-up fixture and drill support are mountable on opposing jaws of a manually operated tool of the type where the jaws may be closed by application of compressive force to a pair of handles.

13 Claims, 3 Drawing Sheets

PORTABLE DRILL GUIDE

BACKGROUND OF THE INVENTION

1. Field of the Invention

The present invention relates to the production of holes in workpieces which have limited accessibility or are difficult to manipulate and particularly to the positioning of a boring tool relative to such workpieces so as to enable the accurate drilling thereof. More specifically, this invention is directed to a hand tool which, when mated with a portable motor driven drill, will engage a workpiece and accurately position and support the drill relative to the workpiece so as to enable the accurate boring thereof. Accordingly, the general objects of the present invention are to provide novel and improved methods and apparatus of such character.

2. Description of the Prior Art

While not limited thereto in its utility, the present invention has been found to be particularly well suited for performing operations on workpieces comprised of sheet metal. An example of such a workpiece is an automobile body panel which will typically be spot welded to an abutting member(s) which may, for example, be in the form of a plate. It is often necessary to replace such panels, for example in the repair of collision damage, and such replacement requires that the welds be "broken" by drilling. The "drilling out" of spot welds which hold a sheet metal panel in place is a difficult and time-consuming task which requires a relatively high level of skill.

The problem briefly discussed above, and problems presented by the need to produce through-holes in other workpieces such as I-beams and channels, has previously been addressed by providing special tools which are expensive and often difficult to use. An example of such a special tool may be seen from U.S. Pat. No. 4,540,319. It has also been suggested, but not implemented on a commercial level, to associate various types of complicated clamp devices with drills. Such clamping devices, examples of which may be seen from U.S. Pat. Nos. 1,926,788 and 2,625,063, have met with very limited success because of inherent deficiencies which will not be discussed herein. There have also been prior art devices which have attempted to employ a portable drill as a stationary drill press. Such devices, as exemplified by the disclosure of U.S. Pat. No. 2,856,799, have lacked portability and the capability of use where space was limited or where the work could not be brought to the tool.

SUMMARY OF THE INVENTION

The present invention overcomes the above-briefly discussed and other deficiencies and disadvantages of the prior art by providing a novel guide which may be easily coupled to a portable drill and, when so coupled, will define a portable drilling device which may be employed to easily and precisely locate a drill bit in relationship to a workpiece. Apparatus in accordance with the present invention is thus characterized by ease of assembly and use.

Apparatus in accordance with a preferred embodiment of the invention comprises, in addition to a portable or hand-operated drill, a guide which engages both the drill and a workpiece and thereby properly positions the drill bit relative to the workpiece. The guide comprises a modified form of a tool having a pair of relatively movable jaws. The first of these jaws carries a replaceable back-up fixture while the opposite jaw is provided with an adjustable drill support. The drill support, in one embodiment, includes a drill extension which couples the chuck of the portable drill to a drill bit. The drill extension includes a collar which may be affixed to the jaw of the tool disposed oppositely to the jaw which carries the back-up fixture. The drill support also includes a stabilizing arm which, in the preferred embodiment, engages the body of the drill to prevent rotation of the drill body. Additional rigidity and stability may be achieved through the use of an elongated support member which engages both the drill body and the stabilizing arm.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures an which.

DESCRIPTION OF THE DISCLOSED EMBODIMENTS

Figure 1:
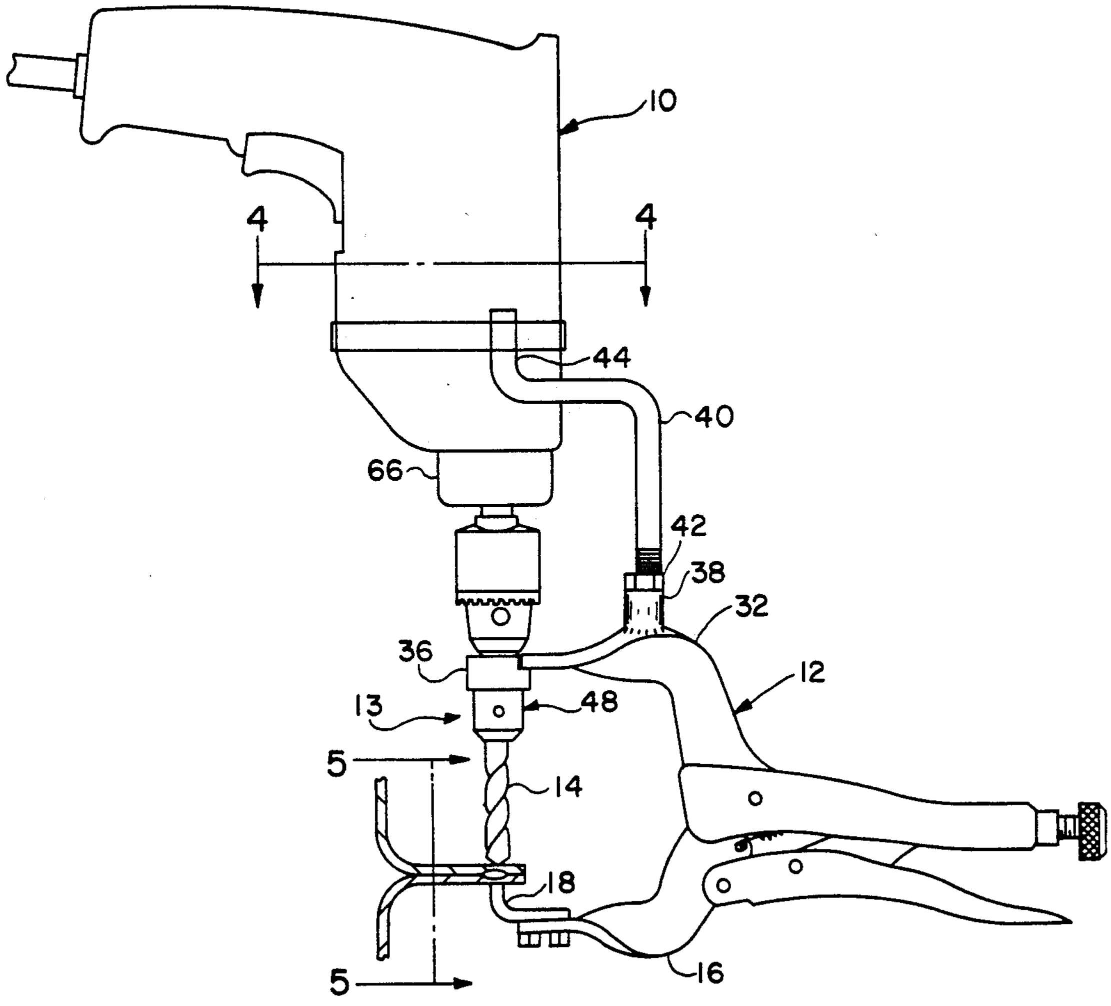
FIG. 1 is a side elevational view of a first embodiment of apparatus in accordance with the invention.

With reference now to the drawings, a complete tool in accordance with the present invention includes a portable drill, indicated generally at 10 in FIG. 1, which may be battery or A.C. powered. Drill 10 will preferably be of the type which includes a pistol grip with a trigger which may be locked in the "on" position. The invention further includes a manually operable guide mechanism which has been indicated generally at 12. In the disclosed embodiments of the invention, guide mechanism 12 includes a modified form of a commercially available tool known as a "Vise Grip". As may be seen from the drawings, and as will be described below, the guide mechanism 12 may be quickly and easily coupled to the body of the drill 10. The manner in which this coupling is accomplished prevents rotation of the drill relative to the guide mechanism and work during drilling, but enables the angular relationship between the drill and guide mechanism to be easily changed to accomodate the working conditions. As may be seen by joint consideration of FIGS. 1-3, the disclosed embodiment of a tool in accordance with the invention also includes a drill extension, indicated generally at 13, by means of which the drill 10 rotatably drives a drill bit 14.

Figure 5:
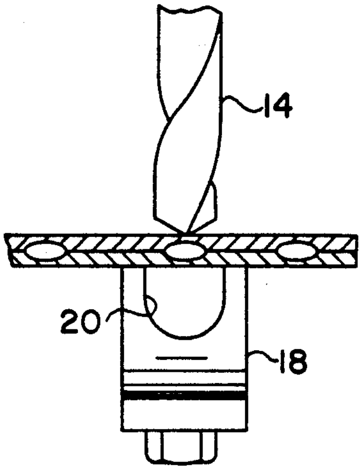
FIG. 5 is a cross-sectional front elevational view taken along line 5—5 of FIG. 1.
Figure 6:
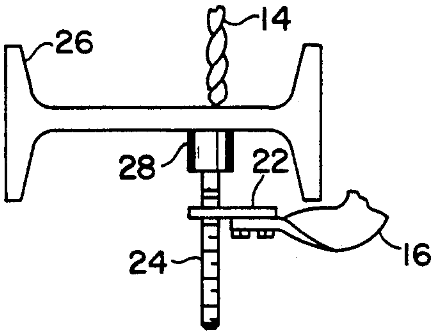
FIG. 6 is a view similar to FIG. 5, taken in a direction transverse to the FIG. 5 view, which shows a modified form of the invention.
Figure 7:
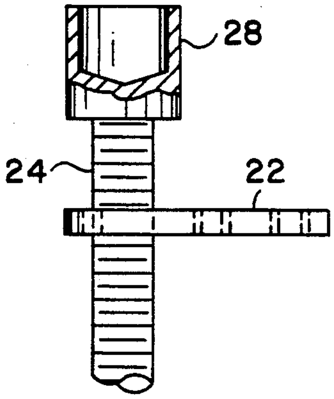
FIG. 7 is an enlarged view, partly in section, of a portion of the modified form of the invention of FIG. 6.
Figure 8:
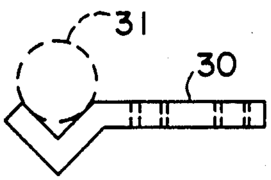
FIG. 8 is a side elevation view, similar to FIG. 7, which shows another modification of the invention.

Referring to FIGS. 1 and 5-7, the guide mechanism 12 has a lower jaw 16 to which a back-up fixture is removably attached. Referring to FIGS. 1 and 5, a first embodiment of a back-up fixture for use in the invention comprises a generally L-shaped arm 18 which, if the tool is to be employed for drilling out spot welds, is provided with a cut-out 20 which defines a pair of spaced contacts. Alternatively, as shown in FIGS. 6 and 7, the back-up fixture may include a first arm 22 and a second, transversely adjustable, member 24 which, typically, will threadably engage arm 22. The end of member 24 which will be positioned against the underside of the workpiece, for example an I-beam shaped member 26 as shown in FIG. 6, may be provided with a socket defining member 28 into which the drill bit 14 may enter after passing through the workpiece. A further embodiment of a back-up fixture, indicated at 30 in FIG. 8, comprises an elongated arm with an end portion configured to mate with the particular workpiece to be drilled. In FIG. 8 the workpiece is schematically represented as a tubular body 31.

Figure 4:
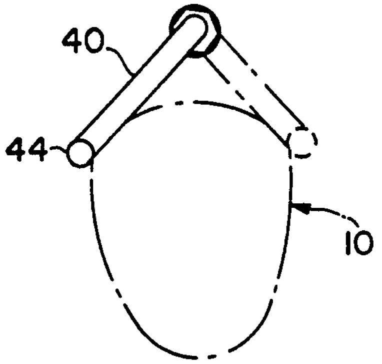
FIG. 4 is a schematic top plan view taken along line 4—4 of FIG. 1.

The upper jaw 32 of the guide mechanism 12 is, as may be seen from FIG. 1, also generally L-shaped. The end of jaw 32 is, in the disclosed embodiment, affixed to a collar portion 36 of the drill extension. Upper jaw 32 is also provided with an integral socket 38 which receives a first threaded end of a stabilizing arm 40. Arm 40 is part of a releasable connection between the drill 10 and the guide mechanism 12. Through the use of the threaded socket 38, arm 40 and a lock nut 42, the angular relationship between arm 40 and jaw 32 may be adjusted or arm 40 may be replaced with arms of different length and shape as required by the particular drill 10 utilized. As may be seen from joint configuration of FIGS. 1 and 4, the upper or free end of arm 40 is in the form of a vertically oriented rod 44 which abuts, but is not physically connected to, the body of drill 10. The contact between rod 44 and the drill housing is, because of the function of the drill extension 13, adequate to prevent rotation of the drill 10 relative to the guide device 12 during the drilling of a workpiece. Simple loosening of lock nut 42 will permit rotation of arm 40 and thus reorientation of drill 10 so that the drill may be placed in the most convenient angular orientation depending upon the nature of the workpiece and the working environment. The present invention is thus an extremely flexible tool which can be configured as a function of the desired use by adjusting the angular orientation of the arm 40 and changing the back-up fixture which is removably attached to the lower jaw 16 of the guide mechanism 12.

Figure 3:
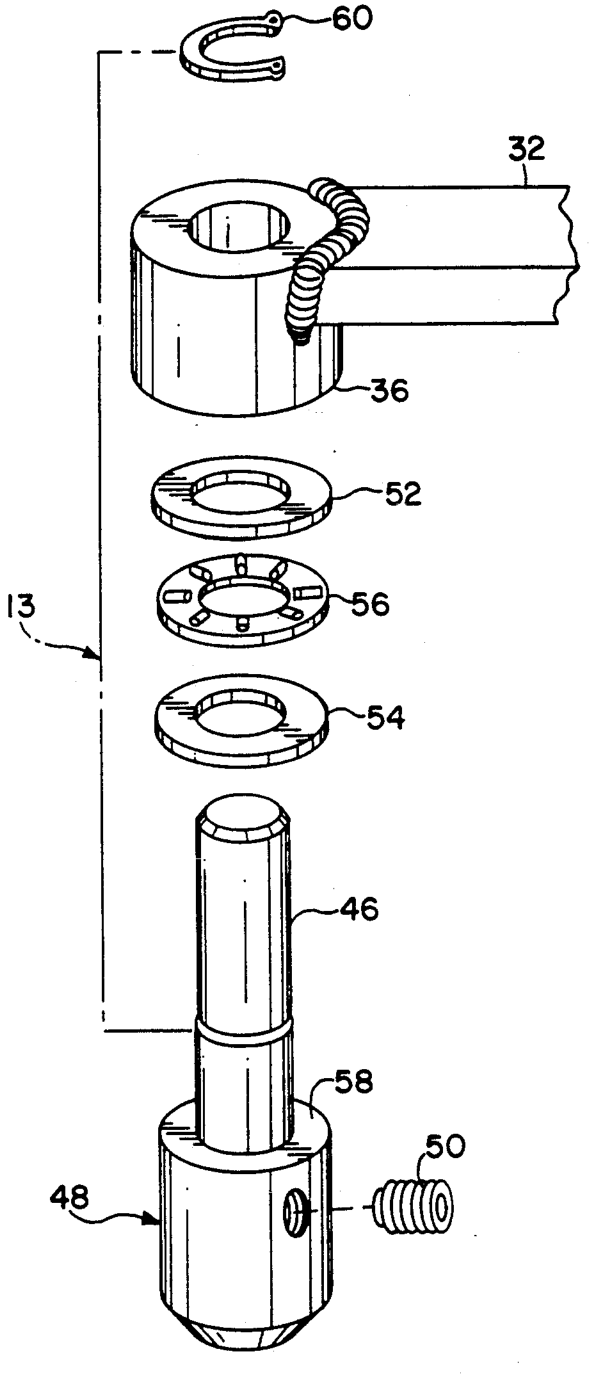
FIG. 3 is an exploded perspective view of the components depicted in FIG. 2 with the drill bit removed.
Figure 2:
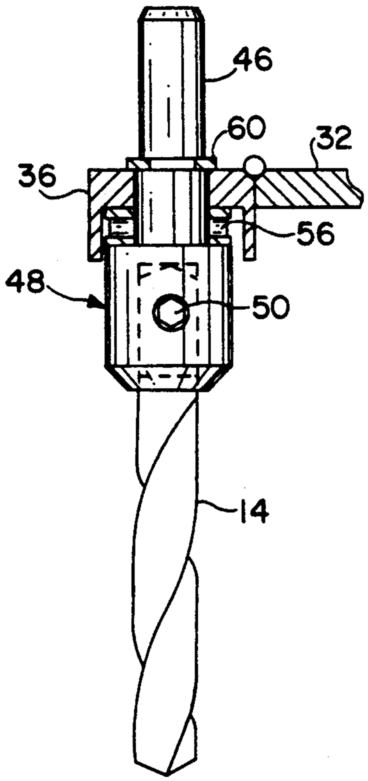
FIG. 2 is an enlarged view, partly in section, of the drill extension portion of the apparatus of FIG. 1.

The drill extension 13 by which the drill 10, and particularly the drill chuck, is coupled to the bit 14 may be seen from joint configuration of FIGS. 1-3. As noted, this extension includes the collar 36. Collar 36 has a cylindrical exterior shape which is complimentary to the shape of the end of upper jaw 32 of guide device 12. In the disclosed embodiment the collar 36 is affixed to the end of jaw 32, for example by a fusion bond. The reduced diameter shaft portion 46 of a drill holder, indicated generally at 48 in FIGS. 1-3, extends through collar 36 and will be engaged by the drill chuck. Sufficient clearance is provided between the internal diameter of the axial hole in collar 36 and the external diameter of shaft 46 to permit the rotation of shaft 46 without significant friction. The shaft of the drill bit 14 is received in the lower large diameter end of holder 48 and is, in the disclosed embodiment, secured for rotation with shaft 46 and holder 48 by means of a set screw 50. A pair of thrust washers 52 and 54 having a bearing member 56 sandwiched therebetween are positioned between the lower side of collar 36 and an upwardly facing shoulder 58, the shoulder being defined by the junction of the shaft 46 and the body portion of drill holder 48. The proper axial positioning of the collar 36, thrust washers and bearing member is maintained by means of a snap ring 60 which engages a slot in shaft 46.

The manner of use of the present invention is best illustrated by FIG. 1. Grasping the handle of drill 10 in one hand and the handles of guide mechanism 12 in the other hand, the user will position the back-up fixture against the workpiece in alignment with the location where the drill bit 14 is to contact the work. The drill bit 14 will then be advanced toward the work by closing jaws 16 and 32 through the application of compressive force to the opposed handles of guide mechanism 12. When the drill bit closely approaches the surface of the work, the drill will be energized by depressing the trigger and continued advancement of the drill into the work will be achieved by continued application of force to the handles of the guide mechanism 12. The maximum penetration of bit 14 into the workpiece will be determined by the setting of guide mechanism 12. As the drill 10 moves toward the workpiece the extension 44 of arm 40 will slide along the body of the drill. Once the desired drilling has been completed, if it is necessary to reverse the drill to free the bit from the work, the lock nut 42 may be loosened and the arm 40 swung about to the position shown in phantom in FIG. 4. With this reversal of arm 40, the direction of rotation of the drill may be reversed and the bit backed out of the work without rotation of the drill relative to the guide mechanism.

Figure 9:
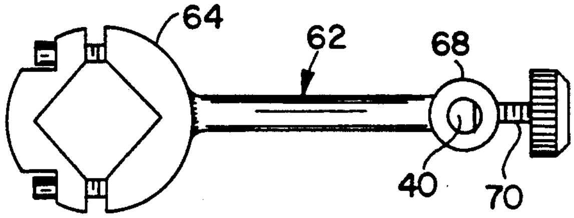
FIG. 9 is a top view of a support member which may be employed to enhance the stability of guide apparatus in accordance with the invention.

In order to enhance rigidity, and thus the stability of a tool in accordance with the invention, the support member which is indicated generally at 62 in FIG. 9 may be affixed to arm 40. Support member 62 is provided, at a first end thereof, with an adjustable clamp 64 which defines a pair of oppositely disposed V-grooves which are designed for engaging the body of drill 10 in the relatively small cross-sectional area 66 thereof (see FIG. 1) which is customarily provided on the drill body immediately above the drill chuck. At the end opposite to clamp 64, the support member 62 is provided with its own integral collar 68, through which the arm 44 passes, and a locking screw 70. For some applications, a modified guide mechanism may be employed in which the permanent connection between collar 36 and the end of jaw 32 is eliminated. In such modified form the collar 36 and jaw 32 will be in contact along complementary arcuate surfaces.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Portable apparatus for drilling workpieces comprising:

an electric drill, said drill having a body and being manually energizable, said drill also having a chuck for delivering torque to a rotatable tool to cause the tool to rotate about an axis; and drill guide means for supporting said drill, said guide means including:

grip means having a pair of relatively movable jaws, each of said jaws having a handle associated therewith, said handles being manually operable with a single hand to cause said jaws to move toward one another;

a back-up fixture removably attached to a first of said jaws for movement therewith; and means for releasably connecting the other of said jaws to the body of said drill, said connecting means causing said axis of rotation to be generally in alignment with said back-up fixture when said jaws are in a closed condition with the back-up fixture positioned against a first side of a workpiece and a rotatable tool driving by said chuck is juxtapositioned to the second side of the workpiece which is disposed oppositely to the workpiece first side, said connecting means including arm means, a portion of said arm means being in contact with the body of said drill, said connecting means further including means for coupling said arm means to said other of said jaws, said coupling means comprising means for establishing a rotatable connection between said arm means and said other jaw whereby the angular orientation between the drill body contacting portion of said arm means and said other jaw may be varied.

2. The apparatus of claim 1 wherein said jaws are elongated and interconnected at a hinge point, said coupling means is located intermediate said hinge point and the end of said other jaw and wherein said connecting means further includes:

a drill extension, said drill extension including a collar affixed to the end of said other jaw, said drill extension also including a drill holder, said drill holder having a shaft which extends through said collar for engagement by the drill chuck, said drill holder shaft being rotatable relative to said collar, said drill holder receiving a drill bit and supporting the bit for rotation about said axis upon rotation of the chuck.

3. The apparatus of claim 2 wherein said back-up fixture comprises:

a jaw extension, said jaw extension being releasably attachable to said first jaw, a workpiece engaging member, said workpiece engaging member having a workpiece contact portion; and means for connecting said workpiece engaging member to said jaw extension whereby the spacing between the workpiece contact portion of said workpiece engaging member and said jaw extension may be varied.

4. The apparatus of claim 3 wherein said workpiece engaging member contact portion defines a socket, said socket being sized and shaped to receive a drill bit which has passed through the workpiece.

5. The apparatus of claim 1 wherein said back-up fixture comprises:

a jaw extension, said jaw extension being releasably attachable to said first jaw;

a workpiece engaging member, said workpiece engaging member having a workpiece contact portion; and means for connecting said workpiece engaging member to said jaw extension whereby the spacing between the workpiece contact portion of said workpiece engaging member and said jaw extension may be varied.

6. Portable apparatus for drilling workpieces comprising:

an electric drill, said drill having a body and being manually energizable, said drill also having a chuck for delivering torque to a rotatable tool to cause the tool to rotate about an axis; and drill guide means for supporting said drill, said guide means including:

grip means having a pair of relatively movable jaws, each of said jaws having a handle associated therewith, said handles being manually operable with a single hand to cause said jaws to move toward one another, said jaws being elongated and interconnected at a hinge point;

a back-up fixture removably attached to a first of said jaws for movement therewith; and means for releasably connecting the other of said jaws to the body of said drill, said connecting means causing said axis of rotation to be generally in alignment with said back-up fixture when said jaws are in a closed condition with the back-up fixture positioned against a first side of a workpiece and a rotatable tool driven by said chuck is juxtapositioned to the second side of the workpiece which is disposed oppositely to the workpiece first side, said connecting means including arm means, a portion of said arm means being in contact with the body of said drill, said connecting means further including means for coupling said arm means to said other of said jaws, said coupling means being located intermediate said hinge point and the end of said other jaw, said connecting means also including a drill extension, said drill extension including a collar affixed to the end of said other jaw, said drill extension further including a drill holder, said drill holder having a shaft which extends through said collar for engagement by the drill chuck, said drill holder shaft being rotatable relative to said collar, said drill holder receiving a drill bit and supporting the bit for rotation about said axis upon rotation of the chuck.

7. The apparatus of claim 6 wherein said coupling means comprises:

means for establishing a rotatable connection between said arm means and said other jaw whereby the angular orientation between the drill body contacting portion of said arm means and said other jaw may be varied.

8. The apparatus of claim 6 wherein said back-up fixture comprises:

a jaw extension, said jaw extension being releasably attachable to said first jaw;

a workpiece engaging member, said workpiece engaging member having a workpiece contact portion; and means for connecting said workpiece engaging member to said jaw extension whereby the spacing between the workpiece contact portion of said workpiece engaging member and said jaw extension may be varied.

9. Portable apparatus for drilling workpieces comprising:

an electric drill, said drill having a body and being manually energizable, said drill also having a chuck for delivering torque to a rotatable tool to cause the tool to rotate about an axis; and drill guide means for supporting said drill, said guide means including:

grip means having a pair of relatively movable jaws, each of said jaws having a handle associated therewith, said handles being manually operable with a single hand to cause said jaws to move toward one another;

a back-up fixture removably attached to a first of said jaws for movement therewith; and means for releasably connecting the other of said jaws to the body of said drill, said connecting means causing said axis of rotation to be generally in alignment with said back-up fixture when said jaws are in a closed condition with the back-up fixture positioned against a first side of a workpiece and a rotatable tool driven by said chuck is juxtapositioned to the second side of the workpiece which is disposed oppositely to the workpiece first side, said connecting means including arm means, said arm means being coupled at a first end to said other of said jaws, said arm means extending outwardly from said other jaw in a direction which is generally parallel to said axis of rotation, said connecting means further including means for releasably attaching said arm means to said drill body, the position of said attaching means on said arm means being adjustable.

10. The apparatus of claim 9 wherein said connecting coupling means further comprises:

means for establishing a rotatable connection between said arm means and said other jaw whereby the angular orientation between the drill body contacting portion of said arm means and said other jaw may be varied.

11. The apparatus of claim 9 further comprising:

means for rotatably adjusting the position of said arm means on said other jaw.

12. The apparatus of claim 9 wherein said back-up fixture comprises:

a jaw extension, said jaw extension being releasably attachable to said first jaw;

a workpiece engaging member, said workpiece engaging member having a workpiece contact portion; and means for connecting said workpiece engaging member to said jaw extension whereby the spacing between the workpiece contact portion of said workpiece engaging member and said jaw extension may be varied.

13. The apparatus of claim 12 further comprising:

means for rotatably adjusting the position of said arm means on said other jaw.

* * * * *